३,८३३,६६५
CYCLOALIPHATIC POLYOLS
Anthony Joseph Papa, St. Albans, W. Va., and William Robert Proops, Claymont, Del., assignors to Union Carbide Corporation, New York, N.Y.
No Drawing. Filed Aug. 16, 1971, Ser. No. 172,262
Int. Cl. C07c 43/18
U.S. Cl. 260—611 R 13 Claims

ABSTRACT OF THE DISCLOSURE

Oxyalkylated derivatives of a 3 - cyclohexene-1,1-dimethanol and a 3,4-dibromocyclohexane-1,1-dimethanol are provided which are useful polyols in the manufacture of polymeric compositions including polyurethanes. Also provided are polymeric compositions to which flame-retardant properties have been imparted by the incorporation therein of a 3,4-dibromocyclohexane-1,1-dimethanol, an oxyalkylated 3,4-dibromocyclohexane-1,1-dimethanol, or a combination thereof. The dibromo-cycloaliphatic diols of the invention are especially useful in the formation of flame-retarded polyurethanes including cellular polyurethanes and, in particular, flexible foams.

---

The present invention relates to particular cycloaliphatic polyols and their use in the formation of polymeric materials including polyurethanes. In a more particular aspect, the invention relates to bromine-substituted cycloaliphatic polyols, their use as flame-retardants, and to flame-retarded polymer compositions, particularly flexible polyurethane foams, produced therewith.

It is known that polyurethane polymers are manufactured by the reaction of polyfunctional isocyanates and polyfunctional active hydrogen-containing compounds such as, in particular, polyethers and polyesters containing free hydroxyl groups, and that cellular products are provided by effecting the reaction in the presence of a blowing agent. Notwithstanding their many useful properties which have contributed to their acceptance in the transportation, building, household and textile industries, it is recognized that an objectionable characteristic of polyurethanes, particularly when in cellular form, is their risk of flammability in applications where exposure to high temperatures and/or an open flame may be encountered. This problem which also exists with respect to other synthetic polymers including condensation polymers such as thermosetting polyesters, polyepoxides and thermoplastic polyesters, and addition polymers such as polypropylene and polystyrene, has of course received considerable attention with the result that a variety of compounds which are largely phosphorus-containing compounds and halogen-substituted organic compounds, have been reported as effective agents for reducing flammability.

As between various types of polymers including resinous coating compositions and cellular materials ranging from the open cell flexible foams to the closed and more highly cross-linked rigid foams, the flexible cellular polymers are inherently more difficult to flameproof without substantially upsetting the delicate balance of foam properties and open cell nature. A further factor which magnifies the difficulty of providing satisfactory flame-retarded flexible foams is that such foams generally exhibit a greater tendency to ignite at temperatures lower than the combustion temperatures of rigid foams. Thus, a particular compound which may be effective in reducing the flammability of rigid foams, may be too stable at lower temperatures to be an efficient flame-retardant of flexible cellular materials. In the past, flexible polyurethane foams have usually been flame-retardant by the use of halogen- and phosphorus-containing compounds. Of these, the preferred materials have been of the additive type but as such they are gradually lost due to volatilization. It is desirable therefore, to employ flame-retardant agents that are reactive with polyisocyanates in forming urethane linkages and thereby become an integral part of the chemical structure of the urethane polymer. Among the halogen-substituted compounds reported as capable of imparting a degree of flame-retardancy to various types of normally flammable polymers are certain bromine-substituted acrylic saturated alcohols and ether diols. One such compound is 2,3-dibromopropanol ($CH_2BrCHBrCH_2OH$) which, in accordance with British Patent Specifications 895,966 and 889,720, reduces flammability of polyurethanes when used either as such or in combination with antimony oxide. Further, in British Patent Specification 1,063,605, it is reported that polyurethane coating compositions of improved fire-retardant properties are provided by the incorporation therein of 3 - bromo-2,2-bis(bromomethyl)-propanol, 2,2 - bis(bromomethyl)1-,3-propanediol, or a mixture thereof. The brominated diol which is also referred to in the art as dibromoneopentyl glycol, has the formula, $(HOCH_2)_2C(CH_2Br)_2$. Further, in U.S. Pat. No. 3,252,922, particular brominated ether alcohols having the groups, —$CHBrCHBrCH_2$—O— or —$CHBr$—$CH_2$—O—, as the sole brominated sites are reported as useful in providing difficulty combustible elastic foams. One such compound is 2,3-dibromobutanediol-1,4-mono-2-hydroxyethyl ether which has the formula, $$HOCH_2CHBrCHBrCH_2—O—CH_2CH_2OH.$$

The common structural feature of each of the aforesaid brominated acyclic compounds is that bromine is bonded to a carbon atom which is no further removed than the gamma-position to ether or hydroxyl oxygen. This may be due to the belief that ability of such bromo-alcohols to impart a degree of flame-retardancy requires that bromine be bonded to carbon atoms which are in the aforementioned close proximity to either ether or hydroxyl oxygen.

It is an object of this invention to provide a particular class of polyols which are useful as flame-retarding agents or as intermediates in the preparation of flame-retarding agents.

Another object is to provide a novel class of polyols having two bromine substituents to the molecule and in which the bromine substituents are bonded to respective carbon atoms which are further removed than the gamma-position to the hydroxyl groups.

Another object is to provide normally liquid bromine-containing polyols which are capable of imparting flame-retardant, including self-extinguishing, characteristics to urethane polymers and which are compatible with various components normally employed in the production of polyurethanes, such as in particular, polyether polyols.

A further object is to provide polyurethanes, particularly flexible polyurethane foams, of improved fire-resistance, and a method for producing such flame-retarded polymers.

Various other objects and advantages of this invention will become apparent to those skilled in the art from the accompanying description and disclosure.

In accordance with one aspect of the present invention, novel cycloaliphatic polyols are provided which comprise an oxyalkylated 3-cyclohexene-1,1-dimethanol and an oxyalkylated 3,4-dibromocyclohexane-1,1-dimethanol. In addition to the two oxyalkylated methylol groups bonded to the carbon atom in the 1-position, the valences of the remaining carbon atoms of the respective 3-cyclohexene and 3,4-dibromocyclohexane cyclic nuclei are satisfied by bonds to hydrogen, an alkyl radical having from 1 to 6 carbon atoms or a phenyl radical. The novel cycloaliphatic polyols provided by the present invention include compounds having the following general Formula I:

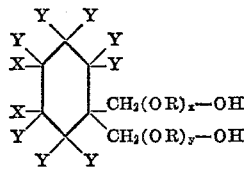

(I)

wherein:

X is bromine and the two X's collectively represent a second bond between the two adjacent carbon atoms;

Y designates hydrogen, an alkyl radical having up to 6 and preferably not more than 4 carbon atoms, or a phenyl radical;

R designates a bivalent hydrocarbon radical having from 2 to 10 carbon atoms; and $x$ and $y$ each has a value of from 0 to about 12, provided the sum $x+y$ is a positive number having an average value no greater than about 12. Usually, the average value of the sum $x+y$ is at least about 0.5 and no higher than about 10.

The novel compositions of this invention are useful in the formation of polymers by the reaction of their hydroxyl groups with functional groups of other polymer-building units such as, for example, isocyanato groups of organic polyisocyanates to form polymers having urethane linkages, and carboxylic acid groups of aliphatic and aromatic acid-containing materials to form polymers having ester linkages. The compositions encompassed by Formula I in which the two X's taken together form a second bond between the adjacent carbon atoms (that is, the oxyalkylated 3-cyclohexene polyols) are also useful as the starting materials for producing the corresponding dibrominated compounds (that is, the 3,4- dibromocyclohexane polyols encompassed by Formula I wherein each X represents a bromine atom).

In accordance with another aspect of the present invention, the flammability of polymers normally susceptible to burning is reduced by the incorporation therein of a flame-retarding agent comprising a 3,4-dibromocyclohexane-1,1-dimethanol, the aforementioned oxyalkylated derivatives of a 3,4-dibromocyclohexane-1,1-dimethanol, and any combination of such dibromocyclohexane polyols. The flame-retarding agents of the present invention, therefore, comprise the 3,4-dibromocyclohexane polyols having the following Formula II:

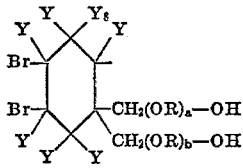

(II)

wherein Y and R are as above-defined with specific reference to Formula I, $a$ and $b$ may each have a value of from zero to 12, and the sum $a+b$ is either zero or a positive number having the value of the aforesaid sum $x+y$ (that is, when $a+b$ is a positive number, the average value thereof is no greater than about 12 and is usually at least about 0.5). When $a+b$ is zero, the flame-retarding agents employed in accordance with the invention are the 3,4 - dibromocyclohexane - 1,1 - dimethanol compounds depicted by the following general Formula III:

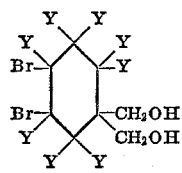

(III)

wherein Y has the aforesaid significance. When the sum $a+b$ of Formula II is a positive number, the flame-retardants of the present invention are the novel oxyalkylated 3,4-dibromocyclohexane polyols encompassed by Formula I above wherein both X's are bromine, as shown by the following Formula IV:

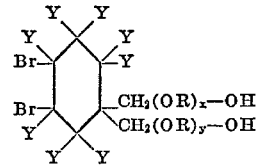

(IV)

wherein Y, R, $x$, $y$ and $x+y$, are as above-defined.

The 3,4-dibromocyclohexane polyols encompassed by generic Formula II are especially useful in providing polyurethanes of reduced flammability. In accordance with one embodiment of this aspect of the present invention, therefore, flame-retarded urethane polymers are provided by the reaction of: (1) an organic polyisocyanate, (2) a 3,4-dibromocyclohexane-1,1-dimethanol or an oxyalkylated derivative thereof, and (3) an additional polyol containing an average of at least two hydroxyl groups per molecule such as, in particular, polyether polyols and polyester polyols. In producing the flame-retarded urethane polymers of this invention, the 3,4-dibromocyclohexane-1,1-dimethanol or oxyalkylated derivative thereof may be employed as such or as a prepolymer containing free isocyanato groups formed by prereaction of the 3,4-dibromocyclohexane polyol with an organic polyisocyanate. The polyurethanes including the flame-retarded polyurethanes of the present invention may be produced as flexible, semi-flexible and rigid foams (i.e., cellular polyurethanes), flexible and stiff fibers, coatings, films, elastomers and the like.

As previously noted, the Y radical bonded to the cycloaliphatic nucleus of the compounds depicted by Formulas I-IV above, may be hydrogen, a phenyl radical, or an alkyl radical having up to 6 carbon atoms including linear and branched radicals. Ilustrative of suitable alkyls encompassed by Y are methyl, ethyl, n-propyl, isopropyl, n-butyl, isobutyl, pentyl and hexyl radicals of which lower alkyls are preferred, the term "lower" as used herein denoting from 1 to 4 carbon atoms. It is to be understood that the Y radicals bonded to the cycloaliphatic nucleus may be the same as or different from one another and that any combination thereof may be present.

The bivalent hydrocarbon radical (R) of the oxyalkylated portion of the novel cycloaliphatic polyols of this invention as depicted by Formulas I, II (wherein $a+b$ is a positive number) and IV above, has the more specific structure:

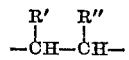

wherein R' and R" represent hydrogen or an alkyl radical having from 1 to 8 carbon atoms, and may be the same or different, and R" may additionally be a phenyl radical. The preferred R' and R" radicals are hydrogen and lower alkyl groups. Illustrative of suitable bivalent radicals encompassed by the R group of general Formulas I, II and IV above are: ethylene, propylene [—$CH_2CH(CH_3)$—], n-butylene, isobutylene, 1-methyl-2-ethyl-ethylene, 1-methyl-2-pentyl-ethylene and phenylethylene radicals.

A preferred class of flame-retardants for use in accordance with the present invention are compounds, including mixtures thereof, having the following Formula V:

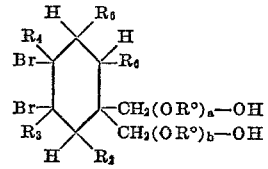

(V)

wherein $a$, $b$ and $a+b$ have the aforesaid significance; $R_2$, $R_3$, $R_4$, $R_5$ and $R_6$ respectively designate hydrogen or a lower alkyl group; and $R°$ represents a bivalent alkylene group having from 2 to 4 carbon atoms.

Illustrative of specific 3,4-dibromocyclohexane-1,1-dimethanol compounds encompassed by Formula III above (and by Formulas II and V wherein $a$ and $b$ are each zero) and which are employed as flame-retardants in accordance with the method of this invention are:

3,4-dibromocyclohexane-1,1-dimethanol;
2-methyl-3,4-dibromocyclohexane-1,1-dimethanol;
2-ethyl-3,4-dibromocyclohexane-1,1-dimethanol;
2-butyl-3,4-dibromocyclohexane-1,1-dimethanol;
2-phenyl-3,4-dibromocyclohexane-1,1-dimethanol;
6-methyl-2-phenyl-3,4-dibromocyclohexane-1,1-dimethanol;
2,6-dimethyl-2-phenyl-3,4-dibromocyclohexane-1,1-dimethanol;
2,4,6-trimethyl-3,4-dibromocyclohexane-1,1-dimethanol;
6-methyl-3,4-dibromocyclohexane-1,1-dimethanol;
3,6-dimethyl-3,4-dibromocyclohexane-1,1-dimethanol;

and any combination of the aforesaid compounds.

Illustrative of the oxyalkylated 3,4-dibromocyclohexane polyols encompassed by Formulas I and IV and by Formulas II and V (wherein $a+b$ is a positive number) and which are useful as flame-retardants as described herein are: the alkylene oxide adducts of each of the aforesaid specific 3,4-dibromocyclohexane - 1,1 - dimethanol compounds wherein the oxyalkylene units are, for example, oxyethylene, oxypropylene or oxybutylene units including any combination thereof.

A particularly preferred class of the novel cycloaliphatic polyols of this invention are the polyols encompassed by general Formula I wherein Y in each instance is hydrogen and the oxyalkylene units (—OR—) are oxyethylene, oxypropylene or any combination thereof, as depicted by the following Formula VI:

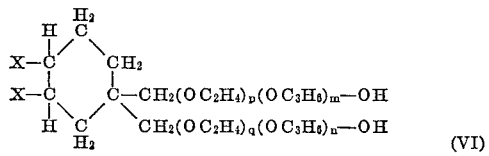

When the two X's collectively represent a second bond between the 3,4- carbon atoms, the polyols are ethylene oxide and/or propylene oxide adducts of 3-cyclohexene-1,1-dimethanol, as shown by the following structural formula,

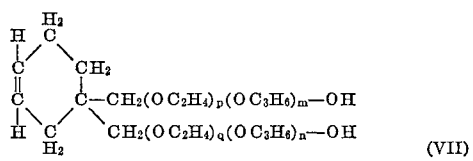

and, when each X of Formula VI is a bromine atom, the compounds are alkylene oxide adducts of 3,4-dibromocyclohexane-1,1-dimethanol, as shown by the following structural formula,

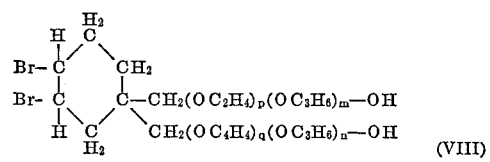

In Formulas VI–VIII, $p$, $q$, $m$ and $n$ may each have a value of from zero to about 12, provided $p+q+m+n$ is a positive number having an average value no greater than about 12. Usually, the aforesaid sum is at least about 0.5 and no greater than about 10. In order to provide normally liquid polyols and thus realize the processing advantages associated therewith, the combined average number of mols of the oxyalkylene units per mol of the 1,1-dimethanol compound is at least about 0.7 (that is, the sum $m+n+p+q$ of Formulas VI–VIII has an average value of at least about 0.7). From the standpoint of providing flame-retarded polyurethane foams which also have self-extinguishing characteristics (as determined by flammability test ASTM D 1692–67 T), the novel oxyalkylated 3,4 - dibromocyclohexane-1,1-dimethanol flame-retardants of this invention contain less than 2 and usually no more than about 1.6 mols of alkylene oxide per mol of 3,4-dibromocyclohexane-1,1-dimethanol (that is, the sum $m+n+p+q$ of Formula VIII is less than 2 and usually no more than about 1.6).

The novel oxyalkylated 3-cyclohexene-1,1-dimethanol compounds of the present invention are prepared by the method which comprises reacting a 3-cyclohexene-1,1-dimethanol and a vicinal epoxide. The latter reactant is the source of the —$(OR)_x$— and —$(OR)_y$— groups of Formula I and thus, for convenience, may be shown as

wherein the oxy group bridges two adjacent carbon atoms of the bivalent alkylene group, R, which as above-defined, has from 2 to 10 carbon atoms. The preferred vicinal epoxides for use in preparing the 3-cyclohexene polyols encompassed by above Formula I have the formula,

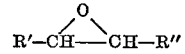

wherein R' and R" represent, as above-defined, hydrogen or an alkyl radical having from 1 to 8 carbon atoms, and may be the same or different, and R" may additionally be a phenyl radical. Illustrative of suitable vicinal epoxide reactants are: ethylene oxide, propylene oxide, butylene oxide (1,2- or 2,3-), 2,3-epoxypentane, 3,4-epoxyhexane, 2,3 - epoxyheptane and other such epoxy-pentanes, -hexanes, -heptanes . . . decanes, inclusive; and styrene oxide. It is to be understood that in producing the novel oxyalkylated 3-cyclohexene compounds of this invention, more than one alkylene oxide reactant may be employed. Especially preferred are ethylene oxide and propylene oxide which can be used singly or in combination and which, upon reaction with the 3-cyclohexene-1,1-dimethanol reactants, provide the adducts typically illustrated by Formula VII.

The oxyalkylation of 3-cyclohexene-1,1-dimethanol compounds is illustrated by the following equation (1):

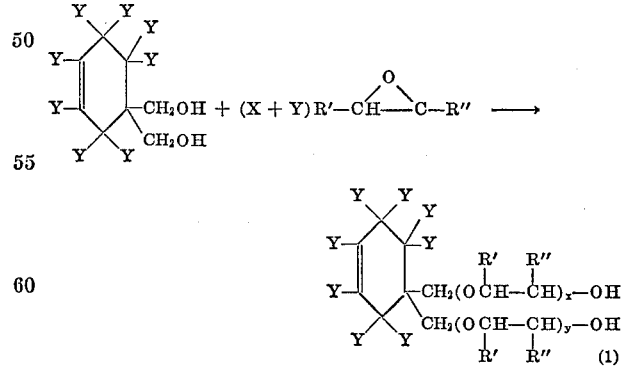

wherein Y, R' and R" have the aforesaid significance, and $x$ and $y$, as also previously defined, may each have a value of from 0 to about 12, provided the sum $x+y$ is a positive number having an average value no greater than about 12.

In producing the novel 3-cyclohexene polyols of this invention, the vicinal epoxide and 3-cyclohexene-1,1-dimethanol reactants are reacted at a temperature between about 90° C. and about 150° C., and preferably at a temperature between about 100° C. and about 130° C. In order to obtain a satisfactory rate of reaction, the oxyalkylation of the 3-cyclohexene-1,1-dimethanol reactants is effected at a pressure above atmospheric such as elevated pressures up to about 200 p.s.i.g.

The oxyalkylation of the 3-cyclohexene-1,1-dimethanol reactant is effected in the presence of a basic catalyst. One class of such catalysts are the oxides, hydroxides and organic salts of the alkali metal and alkaline earth metals. Such metal catalysts are typically illustrated by the following: lithium, sodium, potassium, calcium and barium hydroxides; lithium, sodium and potassium acetates; and magnesium, barium and calcium oxides. Of these, the alkali metal hydroxides are especially suitable. The catalyst is employed in an amount of between about 0.03 and about 1 and usually no more than about 0.5 weight percent, based on the combined weight of the 3-cyclohexene-1,1-dimethanol and vicinal epoxide reactants. Another class of basic materials which may be employed as the oxyalkylation catalyst are amines, particularly tertiary amines. Illustrative of suitable amine catalysts are triethylamine, triethylenediamine, N,N,N',N'-tetramethylbutanediamine and the like.

The reaction is usually carried out under substantially anhydrous conditions and may be effected in the presence or absence of a diluent. When employed, suitable diluents include: aromatic hydrocarbons such as benzene, xylene, toluene; the various chlorinated benzenes such as, for example, chlorbenzene and ortho-dichlorobenzene; dimethoxyethylene glycol; dimethoxydiethyl ether; dioxane; dimethylformamide; dimethylsulfoxide; or any other normally liquid material which is also liquid within the aforesaid temperature range and non-reactive under the reaction conditions.

In effecting the oxyalkylation of the 3-cyclohexene-1,1-dimethanol reactant, between about 0.5 mol and about 12 mols of vicinal epoxide are employed per mol of unsaturated diol. The particular relative proportion employed depends largely on the average number of mols of oxyalkylene units desired in the alkylene oxide/3-cyclohexene-1,1-dimethanol adduct. A convenient procedure for determining when the desired adduct has been formed, is by periodic measurement of the hydroxyl number of the reaction mixture during the course of the reaction. Upon completion of the reaction, the reaction product is treated to remove catalyst and volatile components by conventional techniques.

The 3,4-dibromocyclohexane polyols employed as flame-retardants in accordance with the present invention and having general Formula II hereinabove are provided as the bromination reaction products of 3-cyclohexene polyols as illustrated by the following equation (2):

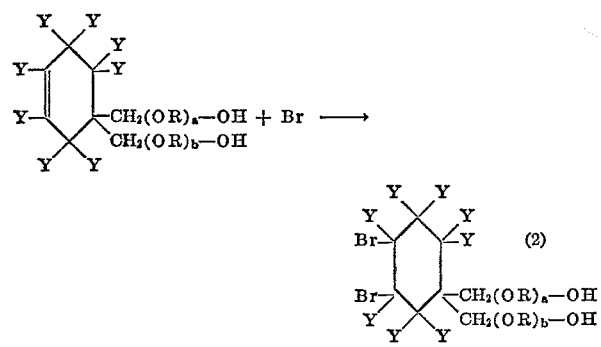

wherein Y, R, a, b and a+b are as previously defined. When a+b is zero, the cycloaliphatic reactant employed in equation (2) is a 3-cyclohexene-1,1-dimethanol and the brominated product is the corresponding 3,4-dibromocyclohexane-1,1-dimethanol derivative, employed as a flame-retardant in accordance with the teachings of this invention. When the sum a+b is a positive number, the unsaturated cycloaliphatic polyol reactant is of the novel class of alkylene oxide/3-cyclohexene-1,1-dimethanol adducts produced in accordance with equation (1) above and the novel flame-retardants described herein are produced as the bromination reaction products thereof, as illustrated by the following equation (3):

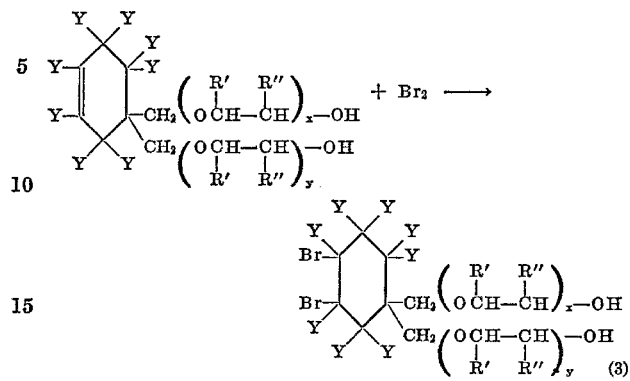

wherein Y, R', R'', $x$, $y$ and $x+y$ are as above-defined. The bromination reactions illustrated by equations (2) and (3) are usually carried out at relatively low temperatures such as from about minus 15° C. to about plus 10° C. and proceed rapidly at substantially atmospheric pressure. The reaction is preferably conducted in the substantial absence of light using about equimolar proportions of reactants, although the reaction may be carried out using a slight deficiency of bromine. The bromination may be carried out in the presence or absence of a diluent or solvent. When used, suitable diluents include the halogen-substituted lower alkanes such as carbon tetrachloride, chloroform and methylene chloride, although other diluents which are liquid and substantially non reactive under the aforesaid conditions may be employed, such as trichloromonofluoromethane, 1,1,2-trichloro-1,2,2-trifluoroethane, benzene and the like. The bromination product is recovered as the product remaining after removal of more volatile components or by other conventional techniques such as extraction or recrystallization, depending upon the physical nature of the dibromocyclohexane diol. When the dibromocyclohexane diol is to be used as the flame-retardant component of polyurethane reaction mixtures containing an amine catalyst, it is usual practice to treat the product to reduce the acid number thereof which is accomplished, for example, by treatment with a strongly basic anion exchange resin to remove bromide ion.

In addition to use as a flame-retardant of urethane polymers, the dibromocyclohexane diols encompassed by general Formula II above, can also be used to impart flame-retardancy to other solid synthetic organic polymers which are normally susceptible to burning. Among such additional polymers are: thermosetting polyesters; polyepoxides; thermo plastic polyesters; and polymers derived from ethylenically unsaturated monomers such as ethylene, propylene, styrene, alkyl-substituted styrenes, lower alkyl acrylates and methacrylates, vinyl acetate, and other resinous polymers well known to the art.

The amount of the dibromocyclohexane diol flame-retardant which is incorporated into any particular polymer composition depends on several factors including the degree of flame-retardancy desired, whether one or more additional flame-retarding agents are employed, the chemical composition of the polymeric material, the physical nature (i.e., cellular or non cellular), and, with respect to cellular polymers, the nature of the cellular structure (i.e., flexible, semi-flexible or rigid). Generally, the polymer compositions of this invention including urethane polymers contain between about 1 and about 25 weight percent of the dibromocyclohexane diols described herein, or amounts sufficient to introduce a bromine content of between about 0.3 and about 8 weight percent.

The flame-retarded polyurethanes of the present invention comprise the reaction products of an organic polyisocyanate, one or more of the dibromocyclohexane diols described herein including the 3,4-dibromocyclohexane-1,1 - dimethanol and oxyalkylated 3,4 - dibromocyclohexane-1,1-dimethanol compounds encompassed by Formula II hereinabove, and an additional polyyol as a third type of reactant. The dibromocyclohexane diol flame-retardant may be present in the urethane-forming reaction mixture either as such or as a prepolymer formed by reaction of the flame-retardant with a polyisocyanate such as any of the polyisocyanates described hereinbelow. In accordance with either embodiment, the dibromocyclohexane diol is used in an amount to provide the polyurethane product with a bromine content of between about 0.3 about 8 weight percent, based on the combined weight of polyisocyanate and total polyol (that is, the 3,4-dibromocyclohexane diol flame-retardant and additional polyol reactant). The aforementioned prepolymers are formed by reacting the dibromocyclohexane diol flame-retardant and polyisocyanate at a temperature between about 65° C. and about 85° C., in relative proportions sufficient to incorporate a predetermined amount of bromine within the aforesaid range into the final urethane polymer product.

The polyisocyanates used in the manufacture of polyurethanes are known to the art and any such reactants are suitably employed in producing the flame-retarded polyurethane compositions of this invention. Among the suitable polyisocyanates are those represented by the general formula:

$$Q(NCO)_i$$

wherein: $i$ has an average value of at least two, and Q is an aliphatic, cycloaliphatic or aromatic radical which can be an unsubstituted hydrocarbyl group or a hydrocarbyl group substituted, for example, with halogen or alkoxy. For example, Q can be an alkylene, cycloalkylene, arylene, alkyl-substituted cycloalkylene, alkarylene or aralkylene radicals including corresponding halogen-substituted radicals. Typical examples of suitable polyisocyanates for use in preparing the flame-retarded polyurethanes of this invention are: 1,6-hexamethylene diisocyanate, 1,4 - tetramethylene diisocyanate, 1-methyl-2,4-diisocyanatocyclohexane, bis(4 - isocyanatophenyl)-methane, phenylene diisocyanates such as 4-methoxy-1,3 - phenylene-diisocyanate, 4-chloro-1,3 - phenylenediisocyanate, 4 - bromo - 1,3 - phenylenediisocyanate, 5,6-dimethyl-1,3-phenylenediisocyanate, 2,4- and 2,6-tolylene diisocyanates, crude tolylene diisocyanate, 6-isopropyl-1,3-phenylenediisocyanate, durylene diisocyanate and triphenylmethane - 4,4',4'' - triisocyanate. Other suitable polyisocyanate reactants are ethylphosphonic diisocyanate and phenylphosphonic diisocyanate.

Also useful in the formation of the flame-retarded polyurethanes of this invention are the polyisocyanates of the aniline-formaldehyde polyaromatic type which are produced by phosgenation of the polyamine obtained by acid-catalyzed condensation of aniline with formaldehyde. Polyphenylmethylene polyisocyanates of this type are available commercially under such trade names as PAPI, AFPI, Mondur MR, Isonate 390P, NCO–120, NCO–10 and NCO–20. These products are low viscosity (50–500 centipoises at 25° C.) liquids having average isocyanato functionalities in the range of about 2.25 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates; and a mixture of isomeric tolylene diisocyanates with polymeric tolylene diisocyanates obtained as residues from the manufacture of the diisocyanates.

The amount of polyisocyanate employed varies slightly depending upon the nature of the polyurethane being prepared. In general, the polyisocyanates are employed in amounts that provide from 80 to 150 percent, preferably from 90 to 120 percent of the stoichiometric amount of the isocyanato groups required to react with all of the hydroxyl groups present in the other reactants of the polyurethane-producing reaction mixture, including the hydroxyl groups of: the 3,4-dibromocyclohexane polyols described herein, the additional polyol reactants described below, and any water which may be present as a source of blowing action.

In producing the flame-retarded urethane polymers of the present invention, one or more polyols in addition to the 3,4-dibromocyclohexane polyols encompassed by Formula II hereinabove, is employed. Such additional active hydrogen-containing compounds have an average of at least two hydroxyl groups per molecule and include compounds which consist of carbon, hydrogen and oxygen and compounds which also contain phosphorus and/or halogen. Suitable classes of such active hydrogen-containing compounds are polyether polyols, polyester polyols, lactone polyols and phosphorus-containing polyols.

Among the suitable polyether polyols that can be employed are the alkylene oxide adducts of water or any of the following polyhydroxyl-containing organic compounds: ethylene glycol; diethylene glycol; propylene glycol; dipropylene glycol; trimethylene glycol; butylene glycols; glycerol; 1,2,6-hexanetriol; 1,1,1-trimethylolethane; 1,1,1-trimethylolpropane; 3-(2-hydroxyethoxy)-1,2-propanediol; pentaerythritol; 1,2-cyclohexanediol; sorbitol; sucrose; lactose; glycosides such as alpha-methylglucoside and alpha-hydroxyalkyl glucoside, fructoside and the like; compounds in which hydroxyl groups are bonded to an aromatic nucleus such as resorcinol, pyrogallol, phloroglucinol, di-, tri-, and tetra-phenylol compounds such as bis-(p-hydroxyphenyl)-methane and 2,2-bis-(p-hydroxyphenyl)-propane, and many other such polyhydroxyl compounds known to the art. The alkylene oxides employed in producing polyether polyols, which are also known as poly(oxyalkylene) polyols, usually have from 2 to 4 carbon atoms and are preferably ethylene oxide, propylene oxide or any combination thereof. In the preparation of mixed poly(oxyethylene-oxypropylene) polyols, the ethylene and propylene oxides may be added to the hydroxyl-containing reactant either in admixture or sequentially.

Suitable polyester polyols for use in producing the flame-retarded polyurethanes of the present invention are the reaction products of: (1) one or more of the aforesaid polyether polyols or one or more of the aforesaid polyhydroxyl-containing organic compounds which are reacted with alkylene oxide to produce such polyether polyols, and (2) a polyfunctional organic carboxylic acid including aliphatic and aromatic acids. Typical examples of suitable polycarboxylic acids that can be employed in producing polyester polyols are: succinic, adipic, sebacic, azelaic, glutaric, pimelic, malonic and suberic acids; and aromatic acids such as phthalic, terephthalic and isophthalic acids and the like.

Other suitable polyols for use in the manufacture of the flame-retarded polyurethanes of this invention are: lactone-based polyols prepared by reacting a lactone such as epsilon-caprolactone or a mixture of epsilon-caprolactone and an alkylene oxide with a polyfunctional initiator such as a polyhydric alcohol, an amine, or an aminoalcohol; and phosphorus-containing polyols such as the alkylene oxide adducts of phosphoric acid, poly-phosphoric acids such as tri- and tetra-phosphoric acids, organo-substituted phosphoric acids such as benzenephosphoric acid and the like.

The particular polyol reactant or combination of polyols employed depends upon the end-use of the polyurethane product which in turn determines whether the product is to be provided as a flexible or rigid material. For this purpose, the polyol reactant is usually characterized by its hydroxyl number which is defined as the number of milligrams of potassium hydroxide required for the complete neutralization of the hydrolysis product of the fully acetylated derivative prepared from 1 gram of polyol or mixtures of polyols. The hydroxyl number can also be defined by the equation:

$$OH = \frac{56.1 \times 1000 \times f}{M.W.}$$

wherein

OH = hydroxyl number of the polyol
$f$ = average functionality, that is, average number of hydroxyl groups per molecule of polyol
M.W. = average molecular weight of the polyol In producing rigid polyurethanes, the polyol preferably possesses a hydroxyl number from about 200 to about 1000. In producing semi-flexible materials, the hydroxyl number is usually from about 100 to about 250. Lower hydroxyl numbers from about 32 to about 150 are usually appropriate for the polyols employed in producing flexible polyurethanes. These ranges of hydroxyl numbers are not intended to be restrictive but are merely presented as illustrative of the relatively large number of possible polyols and combinations thereof that can be employed.

The urethane-forming reaction is usually carried out in the presence of a minor amount of a catalyst comprising an amine. Suitable amine catalysts include one or more of the following: N-methylmorpholine; N-ethylmorpholine; N-octadecylmorpholine; triethylamine; tributylamine; trioctylamine; N,N,N',N' - tetramethylethylenediamine; N,N,N',N' - tetramethyl - 1,3 - butane-diamine; triethanolamine; N,N-dimethylethanolamine; triisopropanolamine; N - methyldiethanolamine; bis(2 - dimethylaminoethyl) ether; hexadecyldimethylamine; N,N - dimethylbenzylamine; trimethylamine; triethylenediamine (i.e., 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. The amine catalyst may be introduced to the polyurethane-producing reaction mixture as such or as a solution in suitable carrier solvents such as diethylene glycol; dipropylene glycol; and 2-methyl-2,4-pentanediol ("hexylene glycol").

The amine catalyst is present in the final urethane-producing reaction mixture in an amount of from about 0.05 to about 3 parts by weight of active catalyst (that is, the amine exclusive of other components present in solutions thereof) per 100 parts by weight of polyol.

In producing polyurethanes from polyether polyols it is often desirable to include as a further component of the reaction mixture a minor amount of certain metal catalysts. Such supplementary catalysts are well known to the urethane art. For example, useful metal catalysts include organotin compounds, particularly tin compounds of carboxylic acids such as stannous octoate, stannous oleate, stannous acetate, stannous laurate, dibutyltin dilaurate, and other such tin salts. Additional metal catalysts are organo-compounds of other polyvalent metals such as zinc and nickel (e.g., nickel acetylacetonate), or other such metal catalysts which are well known in the art of flexible polyether urethane foam manufacture. The amount of each such metal catalyst which can be present in the polyurethane-producing reaction mixture is from about 0.05 to about 2 parts by weight per 100 parts by weight of polyol.

When it is desired to provide the flame-retarded polyurethanes of this invention as cellular products, the polyurethane-forming reaction mixture also includes a minor amount of a foaming or blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80° F. and above minus 60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Illustrative of the fluorocarbon blowing agents are trichloromonofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. When producing flexible foams, the generally preferred method of foaming is the use of water or a combination of water plus a fluorocarbon blowing agent such as trichloromonofluoromethane. On the other hand, in producing rigid foams the blowing agent is usually one of the aforesaid halogenated compounds.

The amount of blowing agent employed in the foaming reaction will vary with factors such as the density that is desired in the foamed product. Usually, however, from about 1 to about 30 parts by weight of the blowing agent per 100 parts by weight of polyol is employed.

In producing flame-retarded cellular polyurethanes in accordance with the method of this invention, a minor amount of a foam stabilizer is also usually present as an additional component of the polyurethane-forming reaction mixture. When used, the foam stabilizer is usually a poly(siloxaneoxyalkylene) block copolymer and may be any of such copolymers described in the art. Generally, the block copolymers comprise: (1) siloxy units having the formula, $Z_2SiO$, (2) polyether-substituted siloxy units having the general formula,

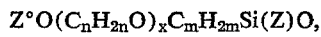

and (3) siloxy units having the formula, $Z_3SiO_{1/2}$, where: Z in each instance is a monovalent hydrocarbon group having from 1 to 12 carbon atoms such as alkyl and aryl groups, in particular methyl; Z° is either Z, Z—C(O) or hydrogen wherein Z is as aforesaid; —$C_mH_{2m}$— is a bivalent hydrocarbon radical, usually of 2 to 5 carbon atoms, that links the respective silicon atoms of the polyether-substituted siloxy units to the polyether block,

wherein $n$ has a value of from 2 to 4 and the average value of $x$ is such that the average molecular weight of the polyether block is from about 200 to about 6000. Illustrative block copolymers for use as foam stabilizers in the foaming reaction of this invention are, for example, the copolymers described in U.S. Pat. Nos. 2,834,748; 2,917,-480; 3,505,377; 3,507,815; 3,563,924; and in U.S. patent application Ser. No. 109,587, filed Jan. 25, 1971, now abandoned. Such copolymer compositions are incorporated herein by reference to the aforesaid patents and application. When used, the foam stabilizer is present in the polyurethane-foaming reaction mixture in an amount within the range of from about 0.2 to about 5 parts by weight or more, per 100 parts by weight of polyol.

The flame-retarded urethane polymers of the invention can take the form of foamed products, elastomers, surface coatings, castings and the like, and may be formed in accordance with any of the processing techniques known to the polyurethane art such as the "one-shot," quasi-prepolymer and prepolymer techniques. For example, in accordance with the "one-shot" process, foamed products are produced by carrying out the reaction of the polyisocyanate, the 3,4-dibromocyclohexane polyol flame-retardants encompassed by Formula II hereinabove (either as such or as a prepolymer with at least a portion of the polyisocyanate reactant), and the additional polyol simultaneously with the foaming operation. In preparing the foamed products in accordance with the quasi-prepolymer technique, the polyisocyanate is first reacted with a portion of the above-described second type of polyol reactant to give a product having a high percentage of free-NCO groups (e.g., from 20 to 50 percent), and the product is subsequently foamed by reaction with additional polyol and foaming agent. In the prepolymer technique, the isocyanate is reacted with a slightly less than stoichiometric quantity of the second type of polyol to form a prepolymer having a low percentage (e.g., from 1 to 10 percent) of free-NCO groups, followed by reaction of the prepolymer with a blowing agent such as water to form the cellular material. In these various multi-stage methods, the 3,4-dibromocyclohexane polyol flame-retardants described herein may be incorporated at any stage either as a separate stream as in the case of the normally liquid flame-retardants described herein including the flame-retardant/polyisocyanate prepolymers, or in combination with the second type of polyol reactant. Elastomers and castings are formed by reaction of the aforesaid prepolymer with a cross-linking agent having reactive hydrogens such as a diamine as typically exemplified by a bis-(aminochlorophenyl)methane. Curing of the prepolymer by atmospheric moisture provides surface coatings.

If desired, other additional ingredients can be employed in minor amounts in producing the polyurethane foams in accordance with the process of this invention. Illustrative of such additives that can be employed are: additional flame-retarding agents, cross-linking agents such as glycerol, triethanolamine and their oxyalkylene adducts, as well as fillers, dyes, pigments, anti-yellowing agents and the like.

The flame-retarded polyurethanes produced in accordance with the present invention are used in the same areas as conventional polyurethanes and are especially useful where fire resistance properties are required. Thus the polymers are useful as textile interliners, cushions, mattresses, paddings, carpet underlay, packaging, gaskets, sealers, thermal insulators and the like.

The following examples are merely illustrative of the present invention and are not intended as a limitation upon the scope thereof.

EXAMPLE I

Preparation of 3,4-dibromocyclohexane-1,1-dimethanol

The reaction of this example was carried out in a 12-liter, 4-necked reaction flask wrapped with aluminum foil to protect the contents from light, and fitted with a Trubor stirrer, thermometer, condenser, and dropping funnel. The flask contained 3-cyclohexene-1,1-dimethanol (710 grams; 5.0 mols) and 5 liters of chloroform to which a solution of bromine (799 grams; 5.0 mols) in one liter of chloroform was added dropwise over a period of four hours while maintaining the reaction mixture at 0° C. The reaction mixture was allowed to warm to ambient temperature while standing overnight. The crude white product was collected by filtration, washed with chloroform (3500 ml.) and dried. The dried product (1168 grams; 78 percent yield) having a melting point of 99°–105° C., was recrystallized from 3.5 liters of hot ethanol thereby providing a substantially pure product (932 grams; 62 percent yield) having a melting point of 127.5°–129° C. Upon analysis, the 3,4-dibromocyclohexane-1,1-dimethanol product was found to contain on a weight percent basis: C, 31.93; H, 4.77; and Br, 53.29 (calculated for $C_8H_{14}Br_2O_2$: C, 31.82; H, 4.67; and Br, 52.92).

EXAMPLES II–XII

In accordance with these examples, polyurethane foams were prepared by reacting and foaming a reaction mixture containing a polyether polyol, a polyisocyanate, water as the source of blowing action, an amine catalyst, stannous octoate, a silicone surfactant as the foam stabilizer and, as the flame-retardant, 3,4-dibromocyclohexane-1,1-dimethanol produced in accordance with Example I above. As control runs, polyurethane foams were also prepared in which either: (1) no flame-retardant was added (Run K), or (2) dibromoneopentyl glycol was incorporated (Runs K–1 and K–2). In each of Examples II–XII and Runs K, K–1 and K–2, the foam formulation contained the components identified in the following Table I wherein the relative proportions of each component are expressed on the standardized basis of 100 parts by weight of the indicated polyether polyol.

TABLE I.—FOAM FORMULATION A

| Component: | Parts by Weight |
| --- | --- |
| Polyether Polyol having a hyhydroxyl number of 56 produced by reacting glycerol and propylene oxide | 100. |
| Tolylene Diisocyanate (Index 105) [1] | Varied [3] to obtain Index 105. |
| Water | 4. |
| Bis-[2-(N,N - dimethylamino) ethyl]ether employed as a 70 weight percent solution in dipropylene glycol | 0.1. |
| Stannous Octoate | 0.2. |
| Silicone Surfactant [2] | 0.5. |
| Flame-Retardant | Varied.[3] |

[1] This component was a mixture of the 2,4- and 2,6-isomers of tolylene diisocyanate present in a weight ratio of 80:20, respectively. Index 105 designates that the amount of mixture employed was 105 weight percent of the stoichiometric amount required to react with total reactive hydrogens from the polyether polyol, diol flame-retardant and water present in the foam formulation.

[2] A polysiloxane-polyoxyalkylene block copolymer having the average formula:

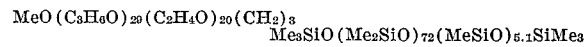

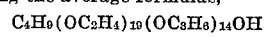

(wherein "Me" represnts a methyl group) employed as an approximately 55 weight percent solution in a solvent medium containing about 90 and 10 weight percent, respectively, of compounds having the average formulas, $$C_4H_9(OC_2H_4)_{19}(OC_3H_6)_{14}OH$$

and $C_9H_{19}C_6H_4(OC_2H_4)_{10.5}OH$.

[3] For specific proportions employed, refer to Table II herein.

The respective foams of Examples II–XII were prepared using the following procedure:

The diisocyanate and silicone surfactant were added to a thoroughly preblended suspension of finely ground 3,4-dibromocyclohexane-1,1-dimethanol in the polyether polyol contained in a ½-gallon container fitted with a baffle. The resultant mixture was stirred for 60 seconds with a high speed stirrer at 2700 r.p.m. After the mixture was allowed to stand for 15 seconds, it was stirred for an additional 15 seconds. During the latter period but after 5 seconds had elapsed, the amine catalyst and water were added as a premixed solution and, after the remaining 10-second period of stirring, the stannous octoate was added from a syringe. When the 15 seconds of stirring was completed, the mixture was quickly poured into a mold (14" x 14" x 6") whereupon the respective masses foamed. Both the cream time and rise time were recorded which terms denote the interval of time from the formation of the complete foam formulation to (1) the appearance of a creamy color in the formulation and (2) the attainment of the maximum height of the foam, respectively. The foams were allowed to stand at ambient conditions for 2 days before flammability, physical and mechanical properties were determined. The specific relative proportions of those components of Foam Formulation A which were varied and the foam properties are given in Table II.

The above procedure was also followed in providing the control foam of Run No. K except, of course, that no flame-retardant was added.

In providing the foams of control Runs K-1 and K-2, the above procedure was also followed except that the dibromoneopentyl glycol was added to the reaction container as a preformed solution in the liquid polyether polyol. The latter solution was prepared by: (1) combining the dibromoneopentyl glycol and polyol in an amount sufficient to provide an 18 weight percent solution thereof in the polyether polyol; (2) heating the resulting suspension at about 70° C. for 1.5 hours to completely solubilize the dibromoneopentyl glycol; and (3) blending the resulting solution in a predetermined amount with additional polyol to provide the relative proportion of dibromoneopentyl glycol per 100 parts by weight of polyol indicated in Table II.

The flammability properties, determined before and after accelerated aging, were measured in accordance with standard flammability test procedure ASTM D 1692-67 T, with the exception that five samples of each foam were tested. The results are given in Table II below wherein:

"SE" indicates that on the basis of the results obtained in the aforesaid flammability test, the foam is rated as self-extinguishing.

"B" indicates that on the basis of the results obtained in the aforesaid flammability test, at least one of the foam samples burned to such an extent that it did not qualify as a self-extinguishing material; therefore, the foam is given a burning ("B") rating.

"Burning Extent" denotes the burned length of the test specimen of the foam; the flammability of the foam is proportional to the burning extent as measured by this test.

"Extinguishing Time" denotes the time taken to give the specified "burning extent."

"Dry Heat Aging" indicates that the foam specimen was heated in an oven at 140° C. for 22 hours, as specified in test method ASTM D 1564-64 T, Sections 38-44.

"Humid Aging" indicates that the foam specimen was subjected to heating at 120° C. for 5 hours in a steam autoclave, as specified in test method ASTM D 1564-64 T, Section 5.1.2.

In addition to flammability properties, Table II also indicates various physical and mechanical properties of the foams produced in Examples II-XII and Runs K, K-1 and K-2 which properties were measured by subjecting the foam samples to the following standardized test procedures.

*Air Porosity*, which is a comparative measurement of the degree of openness of the cells of flexible foams, was determined in accordance with the following test procedure: The test specimen of foam (4" x 4" x ½") is compressed between two pieces of flanged plastic tubing (2¼" I.D.) of an air porosity assembly maintained under an air pressure of 14.7 pounds. Air is drawn through the thickness (½") of the foam specimen at a velocity controlled to maintain a differential pressure of 0.1 inch of water across the thickness dimension. The air flow necessary to develop the requisite pressure differential is recorded and the air flow per unit area of the foam specimen is reported as the air porosity of the foam.

*Density* was measured as described in Sections 68-73 of ASTM D 1564-64 T except that the test specimens had nominal dimensions of 4" x 4" x 1".

*Tensile Strength* and *Ultimate Elongation* were measured in accordance with Sections 81-87 (Suffix T) of ASTM D 1564-64 T, after exposure of the foam specimens to the above-described dry heat aging conditions, and are reported as the median values of three test specimens for each foam sample.

*Tear Resistance* was measured as described in Suffix G of ASTM D 1564-64 T and is reported as the median value of three test specimens for each foam sample.

*Indentation Load Deflection* (ILD Values) to 25% and 65% deflections were measured in accordance with ASTM D 1564-64 T, Sections 19-25 (Method A), except that the dimensions of the foam specimens employed were 12" x 12" x 4". The Return Value is the percentage ratio of the load required to support the return 25% indentation after one minute as compared to the load required to support the initial 25% indentation after one minute. The Load Ratio is the ratio of the 65% and 25% ILD values, respectively.

*Compression Set* at 90% constant deflection was determined in accordance with Sections 12-18 of ASTM D 1564-64 T, the amount of compression set ($C_t$) being expressed as a percent of the original specimen thickness and is reported as the median of three test specimens for each foam sample.

TABLE II

| Example No. (Run No.) | (K) | (K-1) | (K-2) | II | III | IV | V | VI | VII | VIII | IX | X | XI | XII |
|---|---|---|---|---|---|---|---|---|---|---|---|---|---|---|
| Foam formulation A: | | | | | | | | | | | | | | |
| Diisocyanate, pts. by wt | 50.0 | 51.8 | 53.5 | 50.6 | 51.2 | 51.8 | 52.4 | 53.0 | 54.5 | 57.2 | 60.4 | 62.0 | 63.3 | 65.2 |
| Flame Retardant, pts. by wt.: | | | | | | | | | | | | | | |
| 3,4-dibromocyclohexane-1,1-dimethanol | | | | 1 | 2 | 3 | 4 | 5 | 7.5 | 12.0 | 17.0 | 20.0 | 22.0 | 25.0 |
| Dibromoneopentyl glycol | | 2.5 | 5.0 | | | | | | | | | | | |
| Weight percent Br in polymer [1] | 0 | 0.99 | 1.93 | 0.35 | 0.69 | 1.03 | 1.35 | 1.67 | 2.45 | 3.75 | 5.07 | 5.82 | 6.29 | 6.94 |
| Cream time, seconds | 7 | 7 | 7 | 7 | 7 | 7 | 7 | 7 | 7 | 7 | 7 | 7 | 7 | 7 |
| Rise time, seconds | 77 | 84 | 84 | 78 | 80 | 88 | 88 | 91 | 91 | 102 | 100 | 103 | 105 | 110 |
| Flammability by ASTM D 1692-67 T: | | | | | | | | | | | | | | |
| *Before sample conditioning:* | | | | | | | | | | | | | | |
| Rating | B | B | SE | B | B | B | B | SE | SE | SE | SE | SE | SE | SE |
| Burning extent, inches | | | 1.3 | | | | | 3.7 | 3.8 | 1.9 | 2.5 | 2.6 | 3.0 | 3.3 |
| Extinguishing time, seconds | | | 56 | | | | | 38 | 46 | 44 | 32 | 37 | 47 | 55 |
| *After dry heat aging:* | | | | | | | | | | | | | | |
| Rating | B | B | SE | B | B | B | B | B | SE | SE | SE | SE | SE | B |
| Burning extent, inches | | | 2.3 | | | | | | 2.7 | 3.6 | 3.7 | 3.7 | 3.4 | |
| Extinguishing time, seconds | | | 26 | | | | | | 41 | 41 | 40 | 51 | 46 | |
| *After humid aging:* | | | | | | | | | | | | | | |
| Rating | B | B | SE | B | B | B | B | SE | SE | SE | SE | SE | SE | B |
| Burning extent, inches | | | 3.0 | | | | | | 1.9 | 2.9 | 3.2 | 2.1 | 2.6 | |
| Extinguishing time, seconds | | | 34 | | | | | | 44 | 48 | 33 | 31 | 38 | |
| Foam properties: | | | | | | | | | | | | | | |
| Density, lbs./ft.$^3$ | 1.52 | 1.55 | 1.56 | 1.51 | 1.52 | 1.55 | 1.54 | 1.57 | 1.58 | 1.58 | 1.67 | 1.68 | 1.69 | 1.78 |
| Air porosity, ft.$^3$/min./ft.$^2$ | 109 | 115 | 86 | 115 | 113 | 114 | 114 | 114 | 103 | 81 | 24 | 13 | 10 | 5 |
| Tensile strength, p.s.i. | 14.4 | 16.1 | 18.1 | 14.9 | 15.0 | 15.4 | 15.2 | 14.8 | 16.2 | 15.5 | 14.1 | 13.4 | 13.4 | 15.4 |
| Elongation, percent | 187 | 180 | 211 | 192 | 197 | 219 | 203 | 196 | 203 | 199 | 176 | 158 | 159 | 127 |
| Tear resistance, lbs./in | 2.18 | 2.39 | 24.7 | 2.27 | 2.36 | 2.52 | 2.40 | 2.31 | 2.48 | 2.51 | 2.58 | 2.66 | 2.58 | 2.41 |
| 4-inch ILD, lbs./50 in.$^2$: | | | | | | | | | | | | | | |
| 25% deflection | 33 | 36 | 38 | 32 | 31 | 28 | 30 | 31 | 34 | 34 | 37 | 38 | 37 | 47 |
| 65% deflection | 61 | 64 | 68 | 61 | 60 | 56 | 59 | 61 | 67 | 69 | 74 | 77 | 76 | 98 |
| 25% return | 22 | 23 | 24 | 21 | 20 | 19 | 19 | 19 | 20 | 19 | 18 | 18 | 17 | 22 |
| Return value | 68.6 | 64.8 | 62.5 | 67.2 | 64.9 | 65.6 | 63.2 | 62.0 | 60.4 | 55.3 | 47.8 | 47.3 | 45.6 | 47.2 |
| Load ratio | 1.87 | 1.80 | 1.80 | 1.91 | 1.93 | 1.98 | 1.99 | 1.95 | 1.98 | 2.01 | 2.00 | 2.03 | 2.05 | 2.11 |
| 90% compression set, percent | 4.2 | 4.7 | 6.7 | 4.9 | 6.6 | 7.5 | 8.01 | 8.5 | 21.7 | 76.8 | 85.2 | 84.7 | 87.2 | 86.8 |

[1] These values are calculated taking the total weight of the polymer as the combined weight of the diisocyanate, the polyether polyol and flame-retardant employed.

The results of Table II show that, when used in amounts up to 25 and as low as 5 parts by weight per 100 parts of polyether polyol, 3,4-dibromocyclohexane-1,1-dimethanol provides polyurethane foams having self-extinguishing characteristics, as measured by the aforesaid flammability test ASTM D 1692–67 T. Although the flexible polyurethane foams including those rated as self-extinguishing which were produced at the lower concentrations of 3,4-dibromocyclohexane-1,1-dimethanol exhibited a better overall combination of physical and mechanical properties than the self-extinguishing foams containing higher bromine contents, the latter foams are especially useful in applications such as, for example, as carpet underlay, where reduced flammability is a prime consideration and lower breathability (as reflected by air porosity) and higher compression set characteristics are tolerable.

EXAMPLE XIII

In accordance with this example, another series of cellular polyurethanes were prepared following the above-described procedure and employing 3,4-dibromocyclohexane-1,1-dimethanol as the flame-retardant in amounts sufficient to provide the respective polyurethane products with bromine contents of about 1.5, 2, 2.5, 3, 3.5 and 4 weight percent, expressed on the basis of the combined weight of the diisocyanate and total polyol (that is, polyether polyol and 3,4-dibromocyclohexane-1,1-dimethanol). In preparing the series of foams of this example, the polyurethane-forming reaction mixture, designated herein as Foam Formulation B, was as given in the following Table III.

TABLE III.—FOAM FORMULATION B

| Component: | Parts by Weight |
|---|---|
| Polyether Polyol [1] + Flame-Retardant | 100. |
| Flame-Retardant | Varied. |
| Tolylene Diisocyanate (Index 105) [1] | Varied to obtain Index 105. |
| Stannous Octoate | Varied. |
| Water | 4. |
| Amine Catalyst [1] | 0.1. |
| Silicone Surfactant [1] | 0.5. |

[1] As identified in Table I herein.

The specific relative proportions of those components which were present in varying amounts are given in Table IV below which also sets forth the flammability properties of the foamed products, as measured by Oxygen Index in accordance with the procedure standardized as ASTM D 2863–70 using General Electric's Oxygen Index Tester. The Oxygen Index indicates the minimum quantity of oxygen which is necessary to just sustain combustion of the foam sample; therefore, the higher the value of the Oxygen Index, the less flammable is the foam.

As shown by the results of Table IV, the Oxygen Index of each of the foams produced in Example VIII was significantly higher than the value for the control foam of Run K–3, thereby further indicating that the flammability of polyurethane foams is substantially reduced by the incorporation therein of 3,4-dibromocyclohexane-1,1-dimethanol as described herein.

EXAMPLE XIV

Propoxylation of 3-Cyclohexene-1,1-Dimethanol

The reaction of this example was carried out in accordance with the following steps:

*Step 1.*—To a 5-liter capacity vessel there was added 1816 grams of dioxane and 999 grams (about 7 mols) of 3-cyclohexene-1,1-dimethanol which is a solid material. The dimethanol compound was dissolved in the dioxane at 60° C. under an inert atmosphere of nitrogen after which 3.0 grams of potassium hydroxide pellets (85 weight percent) were added. The mixture was heated to remove water which was distilled off through a short column as a water-dioxane binary mixture (boiling at about 88° C.). The distillation was continued to remove a total of 315 grams of distillate, the remaining solution (2490 grams) containing approximately 40 weight percent of 3-cyclohexene-1,1-dimethanol in dioxane. After cooling to 60° C., the solution including the potassium hydroxide catalyst were charged to a two-gallon capacity reactor under nitrogen.

*Step 2.*—Propylene oxide (7 mols) was added to the mixture obtained from Step 1 at a temperature of about 110° C. and 60 p.s.i.g. maximum pressure. After all of the propylene oxide was added and the pressure decreased to 50 p.s.i.g., the pressure was increased to 60 p.s.i.g. with nitrogen. The reaction was carried out at a temperature of about 105°–110° C. for about 6 hours during which the pressure was not allowed to go substantially below 50 p.s.i.g. The reaction product was discharged from the reactor under nitrogen and the catalyst and solvent were removed therefrom as described below.

*Step 3.*—The reaction product produced in Step 2 was neutralized and catalyst was removed therefrom by treatment with a water-washed strongly acidic cation exchange resin (IR–120) for about one hour at 40° C. and then with a water-washed weakly basic anion exchange resin (IR–45) for about 3 hours at 40° C. After filtering, the dioxane solvent and water were stripped from the filtered, catalyst-free reaction product at a final stripping temperature of 100° C. and a reduced pressure of about 2 mm. mercury pressure.

The liquid oxypropylated adduct of 3-cyclohexene-1,1-dimethanol produced in this example has an average molecular weight of 192 (equivalent weight=96), calculated on the basis of the Hydroxyl No. thereof which was found to be 584. The average number of mols of propylene oxide per mol of 3-cyclohexene-1,1-dimethanol is, therefore, 0.86.

TABLE IV

| Example No. (Run No.) | (K-3) | XIII | | | | | |
|---|---|---|---|---|---|---|---|
| Foam No. | Control | 1 | 2 | 3 | 4 | 5 | 6 |
| Foam formulation B: [1] | | | | | | | |
| Polyether polyol, pts. by wt | 100 | 95.7 | 94.2 | 92.75 | 91.2 | 89.7 | 88.2 |
| Diisocyanate, pts. by wt | 49.8 | 52.0 | 52.7 | 53.4 | 54.3 | 55.1 | 55.8 |
| Stannous octoate, pts. by wt | 0.275 | 0.25 | 0.20 | 0.20 | 0.20 | 0.20 | 0.20 |
| 3,4-dibromocyclohexane-1,1-dimethanol, pts. by wt | 0 | 4.3 | 5.8 | 7.25 | 8.8 | 10.3 | 11.8 |
| Weight percent Br in polymer, calcd | 0 | 1.5 | 2.0 | 2.5 | 3.0 | 3.5 | 4 |
| Cream time, seconds | 7 | 7 | 7 | 7 | 7 | 7 | 7 |
| Rise time, seconds | 75 | 75 | 79 | 75 | 78 | 77 | 74 |
| Flammability by oxygen index: Oxygen index | 0.176 | 0.197 | 0.206 | 0.208 | 0.212 | 0.216 | 0.214 |

[1] The relative proportions of the water, amine and silicone surfactant components of Foam Formulation B are as given in Table III herein.

EXAMPLE XV

Bromination of Propoxylated 3-Cyclohexene-1,1-Dimethanol

The 0.86 mol propylene oxide adduct of 3-cyclohexene-1,1-dimethanol (760 grams; 3.96 mols) produced in accordance with Example XIV and 1000 ml. of chloroform were placed in a dry 5-liter, 4-necked flask fitted with a Trubor stirrer, thermometer, condenser, and dropping funnel. The reaction mixture was protected from light by wrapping aluminum foil around the flask. Bromine (627 grams; 3.92 mols) dissolved in 500 ml. of chloroform was added to the stirred reaction mixture over a period of 4 hours while maintaining the temperature at −5° to 0° C. The reaction was exothermic and cooling was necessary throughout the addition of bromine. The yellow-brown liquid reaction product was allowed to warm to ambient (25° C.) temperature on standing overnight. In order to lower the acid number (25.4), the reaction product was treated with five 100-gram batches of strongly basic anion exchange resin (IR–900) to remove bromide ion. This treatment lowered the acid number to 0.387. The ion exchange resin was then removed by filtration and the filtrate was freed of solvent by heating at 46° C. and 4 mm. mercury pressure for one hour. The brominated reaction product (1183 grams; 85 percent yield) of the 0.86 mol propylene oxide adduct produced in accordance with this example is a normally liquid material and has the following characteristics:

Acid Number, mg. KOH/gram _____ 2.30
Hydroxyl Number, mg. KOH/gram
    Found _____ 274.5
    Calculated _____ 318.5
Bromine, Weight Percent
    Found _____ 41.72
    Calculated _____ 45.50
Brookfield Viscosity, Centipoises at 25° C. ____ 147,000

EXAMPLES XVI–XXII

In accordance with these examples, flexible polyurethane foams were prepared using the propylene oxide/3,4-dibromocyclohexane-1,1-dimethanol adduct produced in accordance with Example XV as the flame-retardant component of Foam Formulation B of Table III. Control foams were also prepared in which either no flame-retardant was included (Run K–4) or dibromoneopentyl glycol was employed as the flame-retarding agent (Runs K–5 and K–6). The control foams and the foams of the present invention were prepared following the procedure described with reference to the foam preparations of Table II except that, in view of the normally liquid nature of the propoxylated adduct of 3,4-dibromocyclohexane-1,1-dimethanol, and its compatibility with the polyether polyol component of Foam Formulation B, it was added to the reaction container as a liquid stream and readily formed a homogeneous liquid solution in the polyether polyol at room temperature. The relative proportions of the components which were varied are given in the following Table V which also sets forth the flammability, physical and mechanical properties of the foamed properties, as determined in accordance with the above-described test procedures.

TABLE V

| Example No. (Run No.) | (K–4) | (K–5) | (K–6) | XVI | XVII | XVIII | XIX | XX | XXI | XXII |
|---|---|---|---|---|---|---|---|---|---|---|
| Foam Formulation B: [1] | | | | | | | | | | |
| Polyether polyl, parts by wt | 100 | 100 | 100 | 95 | 93.3 | 91.6 | 89.9 | 88.1 | 86.4 | 84.6 |
| Diisocyanate, parts by wt | 49.8 | 53.3 | 54.6 | 51.5 | 52.2 | 52.9 | 53.4 | 54 | 54.6 | 55.2 |
| Stannous octoate, parts by wt | 0.275 | 0.20 | 0.15 | 0.25 | 0.25 | 0.20 | 0.20 | 0.20 | 0.15 | 0.15 |
| Flame retardant, parts by wt.: | | | | | | | | | | |
|   Propylene oxide/3,4-dibromocyclohexane-1,1-dimethanol Adduct [2] | 0 | | | 5 | 6.7 | 8.4 | 10.1 | 11.9 | 13.6 | 15.4 |
|   Dibromoneopentyl glycol | 0 | 5 | 7 | | | | | | | |
| Weight percent Br in polymer: | | | | | | | | | | |
| Calculated | | 1.93 | 2.64 | 1.50 | 2.00 | 2.50 | 3.00 | 3.50 | 4.00 | 4.50 |
| Observed | | | | 1.38 | 1.84 | 2.30 | 2.74 | 3.22 | 3.68 | 4.14 |
| Cream time, seconds | 7 | 7 | 7 | 10 | 10 | 10 | 10 | 10 | 10 | 10 |
| Rise time, seconds | 79 | 90 | 104 | 87 | 93 | 109 | 197 | 110 | 144 | 153 |
| Flammability properties: | | | | | | | | | | |
| Oxygen index | 0.177 | 0.214 | 0.216 | 0.214 | 0.214 | 0.214 | 0.214 | 0.214 | 0.216 | 0.219 |
| ASTM D 1692-67 T: | | | | | | | | | | |
|   Rating | B | SE | SE | SE | SE | SE | SE | SE | SE | SE |
|   Burning extent, inches | | 3.9 | 2.3 | 3.8 | 3.5 | 3.4 | 2.9 | 2.1 | 2.1 | 2.1 |
|   Extinguishing time, seconds | | 43 | 27 | 33 | 38 | 37 | 31 | 26 | 27 | 24 |
|   Burning rate, inches/minute | 6.6 | 5.4 | 5.1 | 5.9 | 5.6 | 5.5 | 5.7 | 4.9 | 4.7 | 5.2 |
| Foam properties: | | | | | | | | | | |
| Density, lbs./ft.$^3$ | 1.55 | 1.60 | 1.65 | 1.54 | 1.56 | 1.55 | 1.55 | 1.60 | 1.59 | 1.59 |
| Air porosity, ft.$^3$/min./ft.$^2$ | 114 | 78 | 94 | 85 | 56 | 51 | 40 | 34 | 21 | 16 |
| Tensile strength, p.s.i | 15.0 | 17.8 | 19.1 | 18.7 | 18.9 | 19.9 | 19.2 | 19.5 | 21.4 | 20.4 |
| Elongation, percent | 148 | 185 | 188 | 191 | 198 | 201 | 189 | 179 | 185 | 158 |
| Tear resistance, lbs./in | 2.07 | 2.50 | 2.70 | 2.89 | 2.86 | 2.99 | 2.90 | 2.99 | 2.89 | 2.78 |
| 4-inch ILD, lbs./50 in.: [2] | | | | | | | | | | |
|   25% deflection | 42 | 40 | 38 | 41 | 42 | 42 | 44 | 43 | 45 | 47 |
|   65% deflection | 76 | 75 | 73 | 76 | 79 | 81 | 86 | 88 | 93 | 93 |
|   25% return | 27 | 26 | 25 | 26 | 25 | 24 | 25 | 25 | 24 | 24 |
|   Return value | 64 | 64 | 64 | 62 | 61 | 58 | 56 | 57 | 53 | 52 |
|   Load ratio | 1.83 | 1.87 | 1.91 | 1.88 | 1.89 | 1.95 | 1.95 | 2.06 | 2.07 | 2.07 |
| 90% compression set, percent | 4.5 | 7.2 | 8.1 | 6.7 | 10.6 | 18.5 | 41.7 | 41.4 | 83.3 | 89.9 |

[1] The relative proportions of the water, amine and silicone surfactant components of Foam Formulation B are as given in Table III herein.

[2] The product obtained by bromination of the 0.86 mol propylene oxide 3-cyclohexene-1,1-dimethanol adduct, as described in Example XV.

The flammability data of Table V show that the 3,4-dibromocyclohexane-1,1-dimethanol/propylene oxide adduct employed in Examples XVI–XXII, is an efficient flame-retarding agent for flexible polyurethane foams. Thus, comparison of the flammability properties of the foamed products produced in Examples XVI–XXII with those of the control foam of Run K–4 shows that the flame-retarding agent of this invention caused a substantial increase in the Oxygen Index of, and imparted self-extinguishing characteristics to, the foamed products including the product containing the relatively low bromine content of about 1.4 weight percent (Example XVI). The data also show that the flammability properties of the foams of this invention compare favorably with the flammability of the foams produced in control Runs K–5 and K–6 in which the acyclic compound, dibromoneopentyl glycol, was used.

EXAMPLES XXIII–XXVII

In accordance with these examples, additional propylene oxide adducts of 3-cyclohexene-1,1-dimethanol were prepared containing an average number of mols of propylene oxide of about 0.5, 2, 4, 5.4 and 8.3. For convenience these reaction products are designated by the letters A through E, respectively. Products A, B and C were prepared by the reaction of propylene oxide and a dioxane solution of 3-cyclohexene-1,1-dimethanol, in the presence of potassium hydroxide pellets (85 weight percent) as the catalyst, following substantially the same three-step procedure employed in producing the 0.86 mol propylene oxide adduct of Example XIV. The various charges and reaction conditions are given in the following Table VI:

TABLE VI

| Example No | XXIII | XXIV | XXV |
|---|---|---|---|
| Adduct | A | B | C |
| Step 1: | | | |
| Dioxane, grams | 1,816 | 741 | 1,996 |
| 3-cyclohexane-1,1-Dimethanol (CHDM): | | | |
| Gms | 999 | 427 | 853 |
| Mols | 7 | 3 | 6 |
| KOH catalyst, wt. percent [1] | 0.2 | 0.1 | 0.23 |
| H²O/dioxane distillate removed, grams | 315 | 104 | 516 |
| Step 2: | | | |
| Charge to reactor: | | | |
| CHDM/Dioxane Solution, gms | 2,473 | 1,062 | 2,326 |
| Propylene oxide: | | | |
| Gms | 206 | 349 | 1,482 |
| Mols | 3.55 | 6 | 24 |
| Reaction conditions: | | | |
| Temperature, °C | 112±3 | 112±3 | 109±2 |
| Pressure, p.s.i.g | 45-55 | 50-60 | 50-60 |
| Time, hours | 5 | 16 | 15.5 |
| Reaction product removed from step 2, grams | 2,608 | 1,233 | 1,384 |

[1] Basis, total weight of reactants charged, that is, the combined weight of CHDM and propylene oxide.

In each of the reactions of Table VI, the indicated amount of product removed from the reactor (that is, from Step 2) was subjected to Step 3, as described in Example XIV above, in order to remove catalyst, neutralize the product and remove solvent to obtain final products A, B and C.

In accordance with Example XXVI, additional propylene oxide (438 grams; 7.54 mols) was added to 2337 grams of the reaction product remaining in the reactor at the completion of Step 2 of Example XXV, that is, that portion which had not been withdrawn. In addition to potassium hydroxide catalyst and dioxane solvent, the 2337 grams of the aforesaid material contained 3.77 mols of the propylene oxide adduct, designated herein as product C. The continued propoxylation of the latter adduct was carried out at a temperature of 109±1° C. and a pressure of about 50-60 p.s.i.g. for a period of 8 hours. At the end of this period, 1538 grams of product was removed from the reactor and was subjected to the neutralization and solvent stripping procedures of Step 3, as described hereinabove, to provide the adduct designated as D.

In accordance with Example XXVII, additional propylene oxide (390 grams; 6.71 mols) was added to 1237 grams of the reaction product remaining in the reactor at the completion of Step 2 of Example XXVI. In addition to potassium hydroxide catalyst and dioxane solvent, the 1237 grams of the aforesaid material contained 1.68 mols of the propylene oxide adduct, designated herein as product D. The continued propoxylation of the latter adduct was carried out at a temperature of 110±1° C. and a pressure of 50-60 p.s.i.g. for about 10 hours. At the end of the reaction period, 1500 grams of product was removed from the reactor and was subjected to the neutralization and solvent stripping procedures of Step 3, as described hereinabove, to provide the adduct designated as E.

The propylene oxide adducts (A-E) of 3-cyclohexene-1,1-dimethanol produced in accordance with the above Examples XXIII-XXVII (as well as the adduct of Example XIV) have the generic formula given in the following Table VII which also sets forth the respective values of the Hydroxyl No. which was determined for each product.

TABLE VII

Propylene oxide adducts of 3-cyclohexene-1,1-dimethanol having the generic formula

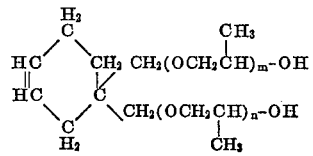

wherein the average value of $m+n$ is given below:

| Example No | XXIII | XXIV | XXV | XXVI | XXVII |
|---|---|---|---|---|---|
| Adduct designation | A | B | C | D | E |
| Properties of adducts: | | | | | |
| Hydroxyl No | 654 | 429.8 | 301.5 | 246.3 | 180.3 |
| Equivalent weight [1] | 85.8 | 130.5 | 186.1 | 227.8 | 311.2 |
| Molecular weight [1] | 171.6 | 261.1 | 372.3 | 455.5 | 622.4 |
| Color, Gardner | | 3 | 3.5 | 2.5 | 2.0 |
| Alkalinity as KOH | Nil | Nil | Nil | Nil | Nil |
| Physical nature | (²) | | Liquid | | |
| Average value of $m+n$ [1] | 0.51 | 2.05 | 3.96 | 5.39 | 8.27 |

[1] Calculated from Hydroxyl No. determinations.
[2] Solid.

EXAMPLES XXVIII-XXXII

In accordance with these examples, the propylene oxide adducts of 3-cyclohexene-1,1-dimethanol produced in accordance with Examples XXIII-XXVII and designated A through E, respectively, were brominated in 1500 ml. of chloroform employing substantially the same reaction conditions and procedure typically illustrated by Example XV. In Example XXVIII, 832 grams (4.85 mols) of propylene oxide/3-cyclohexene-1,1-dimethanol adduct A (0.51 M/M, respectively) was brominated using 766 grams (4.79 mols) of bromine to provide the corresponding 3,4-dibromo derivative, designated A—A, which was a waxy solid. On the other hand, the 3,4-dibromocyclohexane-1,1-dimethanol/propylene oxide products produced using adducts B-E, are normally liquid compositions and are designated B—B through E—E respectively. The amount of reactants employed and the characteristics of these latter brominated products are given in the following Table VIII.

TABLE VIII

| Example No | XXIX | XXX | XXXI | XXXII |
|---|---|---|---|---|
| Reactants: | | | | |
| Propylene oxide/3-cyclohexene-1,1-dimethanol adduct | B | C | D | E |
| $m+n$ [1] | 2.05 | 3.96 | 5.39 | 8.27 |
| Grams | 610 | 713 | 896 | 931 |
| Mols | 2.34 | 1.915 | 1.97 | 1.49 |
| Bromine: | | | | |
| Grams | 371 | 304 | 311.6 | 237 |
| Mols | 2.32 | 1.9 | 1.95 | 1.48 |
| Weight percent Br in product, calcd.[2] | 37.75 | 29.83 | 25.80 | 20.30 |
| Product designation | B—B | C—C | D—D | E—E |
| Product properties: | | | | |
| Hydroxyl number, mg. KOH/gram | 227 | 190 | 163 | 122 |
| Acid number, mg. KOH/gram | 0.295 | 0.133 | 0.112 | 0.07 |
| Brookfield viscosity, cps. at 25° C | 3749 | 3159 | 2038 | 975 |

[1] The sum $m+n$ designates the number of mols of propylene oxide per mol of 3-cyclohexene-1,1-dimethanol, as shown in the generic formula of Table VII.
[2] The respective indicated percentages of bromine content are calculated on the basis of the molecular weights of Adducts B through E (Table VII herein) plus the mols of bromine employed.

EXAMPLES XXXIII-XXXVI

In accordance with each of these examples, a series of cellular polyurethane foams were prepared employing the above-described normally liquid brominated propylene oxide adducts of 3-cyclohexene-1,1-dimethanol, designated B—B through E—E, as the respective flame-retardant components of Foam Formulation B (Table III), following the procedure described with reference to Example XIII. In each example, the flame-retardant was added in amounts to provide the respective polyurethane products with bromine contents of about 1.5, 2, 2.5, 3, 3.5 and 4 weight percent, calculated on the basis of the combined weight of the diisocyanate and total polyol. The relative proportions of the components which were varied are given in the following Tables IX–XII. Flammability was determined for each of the foamed products in accordance with the aforementioned ASTM D 1692–67 T test. It was found that the foamed products did not qualify as self-extinguishing materials as defined by this particular flammability test and, in each instance, a burning ("B") rating was assigned. Flammability by Oxygen Index (ASTM D 2863–70) was also determined and the results are included in Tables IX–XII. The control was the foam produced in Run K–3 of Table IV and, for convenience, is reproduced in each of Tables IX–XII.

Although the polyurethane foams produced in Examples XXXIII–XXXVI of Tables IX–XII were, as previously noted, rated as burners by flammability test ASTM D 1692–67 T, the Oxygen Index values show that in each instance the flammability of the foams was reduced by the presence therein of the propoxylated cycloaliphatic dibromides of the present invention.

EXAMPLE XXXVII

Preparation of One Mol Propylene Oxide/3,4-Dibromocyclohexane-1,1-Dimethanol and Diisocyanate Prepolymers Thereof A. Oxypropylation Reaction.—To a reactor there were charged (on a weight basis) 40 parts of dioxane, 22 parts

TABLE IX

| Example No. (Run No.) | (K-3) | XXXIII | | | | | |
|---|---|---|---|---|---|---|---|
| Foam No. | Control | 1 | 2 | 3 | 4 | 5 | 6 |
| Foam formulation B:[1] | | | | | | | |
| Polyether polyol, pts. by wt. | 100 | 94 | 92 | 89.9 | 87.8 | 85.8 | 83.7 |
| Diisocyanate, pts. by wt. | 49.8 | 51.5 | 52.0 | 52.6 | 53.1 | 53.7 | 54.3 |
| Stannous octoate, pts. by wt. | 0.275 | 0.25 | 0.25 | 0.20 | 0.20 | 0.20 | 0.15 |
| Propylene oxide/3,4-dibromocyclohexane-1,1-dimethanol adduct B—B,[2] parts by weight. | 0 | 6 | 8 | 10.1 | 12.2 | 14.2 | 16.3 |
| Weight percent Br in polymer, calcd. | 0 | 1.5 | 2.0 | 2.5 | 3.0 | 3.5 | 4.0 |
| Cream time, seconds | 7 | 7 | 7 | 7 | 7 | 7 | 7 |
| Rise time, seconds | 75 | 81 | 83 | 91 | 92 | 94 | 9 |
| Flammability by oxygen index: Oxygen index | 0.176 | 0.204 | 0.212 | 0.202 | 0.208 | 0.209 | 0.209 |

[1] The relative proportions of the water, amine and silicone surfactant components of Foam Formulation B are as given in Table III herein.
[2] The product obtained by bromination of propylene oxide/3-cyclohexene-1,1 dimethanol Adduct B (2.05 M/M), as described in Example XXIX.

TABLE X

| Example No. (Run No.) | (K-3) | XXXIV | | | | | |
|---|---|---|---|---|---|---|---|
| Foam No. | Control | 1 | 2 | 3 | 4 | 5 | 6 |
| Foam formulation B:[1] | | | | | | | |
| Polyether polyol, pts. by wt. | 100 | 92.4 | 89.8 | 87.2 | 84.6 | 82.0 | 79.3 |
| Diisocyanate, pts. by wt. | 49.8 | 51.4 | 52.0 | 52.6 | 53.0 | 53.7 | 54.3 |
| Stannous octoate, pts. by wt. | 0.275 | 0.25 | 0.25 | 0.20 | 0.20 | 0.20 | 0.15 |
| Propylene oxide/3,4-dibromocyclohexane-1,1-dimethanol adduct C—C,[2] parts by weight. | 0 | 7.6 | 10.2 | 12.8 | 15.4 | 18.0 | 20.7 |
| Weight percent Br in polymer, calcd. | 0 | 1.5 | 2.0 | 2.5 | 3.0 | 3.5 | 4.0 |
| Cream time, seconds | 7 | 7 | 7 | 7 | 7 | 7 | 7 |
| Rise time, seconds | 75 | 78 | 81 | 87 | 85 | 85 | 95 |
| Flammability by oxygen index: Oxygen index | 0.176 | 0.202 | 0.206 | 0.202 | 0.202 | 0.202 | 0.197 |

[1] The relative proportions of the water, amine and silicone surfactant components of Foam Formulation B are as given in Table III herein.
[2] The product obtained by bromination of propylene oxide/3-cyclohexene-1,1-dimethanol Adduct C (3.96 M/M), as described in Example XXX.

TABLE XI

| Example No. (Run No.) | (K-3) | XXXV | | | | | |
|---|---|---|---|---|---|---|---|
| Foam No. | Control | 1 | 2 | 3 | 4 | 5 | 6 |
| Foam formulation B:[1] | | | | | | | |
| Polyether Polyol, pts. by wt. | 100 | 91.2 | 88.3 | 85.2 | 82.2 | 79.1 | 76.1 |
| Diisocyanate, pts. by wt. | 49.8 | 51.1 | 51.8 | 52.4 | 52.9 | 53.5 | 53.9 |
| Stannous octoate, pts. by wt. | 0.275 | 0.25 | 0.25 | 0.20 | 0.20 | 0.20 | 0.20 |
| Propylene oxide/3,4-dibromocyclohexane-1,1-dimethanol adduct D—D,[2] parts by weight. | 0 | 8.8 | 11.7 | 14.8 | 17.8 | 20.9 | 23.9 |
| Weight percent Br in polymer, calcd. | 0 | 1.5 | 2.0 | 2.5 | 3.0 | 3.5 | 4.0 |
| Cream time, seconds | 7 | 7 | 7 | 7 | 7 | 7 | 7 |
| Rise time, seconds | 75 | 80 | 81 | 89 | 92 | 94 | 100 |
| Flammability by oxygen index: Oxygen index | 0.176 | 0.200 | 0.202 | 0.197 | 0.200 | 0.200 | 0.201 |

[1] The relative proportions of the water, amine and silicone surfactant components of Foam Formulation B are as given in Table III herein.
[2] The product obtained by bromination of propylene oxide/3-cyclohexene-1,1-dimethanol Adduct D (5.39 M/M), as described in Example XXXI.

TABLE XII

| Example No. (Run No.) | (K-3) | XXXVI | | | | | |
|---|---|---|---|---|---|---|---|
| Foam No. | Control | 1 | 2 | 3 | 4 | 5 | 6 |
| Foam formulation B:[1] | | | | | | | |
| Polyether polyol, pts. by wt. | 100 | 88.9 | 85.0 | 81.3 | 77.6 | 73.7 | 70.0 |
| Diisocyante, pts. by wt. | 49.8 | 51.0 | 51.4 | 51.8 | 52.2 | 52.6 | 53.0 |
| Stannous octoate, pts. by wt. | 0.275 | 0.25 | 0.25 | 0.20 | 0.20 | 0.20 | 0.20 |
| Propylene oxide/3,4-dibromocyclohexane-1,1-dimethanol adduct E—E,[2] parts by weight. | 0 | 11.1 | 15.0 | 18.7 | 22.4 | 26.3 | 30.0 |
| Weight percent Br in polymer, calcd. | 0 | 1.5 | 2.0 | 2.5 | 3.0 | 3.5 | 4.0 |
| Cream time, seconds | 7 | 7 | 7 | 7 | 7 | 7 | 7 |
| Rise time, seconds | 75 | 78 | 80 | 92 | 93 | 94 | 103 |
| Flammability by oxygen index: Oxygen index | 0.176 | 0.197 | 0.199 | 0.197 | 0.197 | 0.195 | 0.197 |

[1] The relative proportions of the water, amine and silicone surfactant components of Foam Formulation B are as given in Table III herein.
[2] The product obtained by bromination of propylene oxide/3 cyclohexene-1,1-dimethanol Adduct E (8.27 M/M), as described in Example XXXII.

of 3-cyclohexene-1,1-dimethanol and about 0.016 parts of potassium hydroxide flake (90 weight percent) as the catalyst. The charge was heated to 110° C. under nitrogen with stirring and propylene oxide was fed thereto. The reaction period was continued until the Hydroxyl No. of the reaction product was 560 mg. KOH/gram at which point a total of 14.27 parts by weight of propylene oxide had been added. Dioxane solvent was removed at 96° C. and 20 mm. mercury pressure. On the basis of the aforesaid determined Hydroxyl No. of 560, the calculated molecular weight of the propylene oxide/3-cyclohexene-1,1-dimethanol adduct is 200.4 and the structure assigned thereto is as shown by the generic formula of Table VII wherein $m+n$ has an average value of about one.

B. Bromination Reaction.—Prior to bromination, a portion of the product of the oxypropylation reaction of part A of this example, was diluted with methylene chloride and treated with a strongly acidic cation exchange resin (IR–120) to remove catalyst. After removal of solvent by stripping, the propylene oxide/3-cyclohexene-1,1-dimethanol adduct was brominated in methylene chloride solvent employing 6308 grams (31.5 mols) of adduct, 4985 grams (31.2 mols) of bromine and a total of 9400 ml. of solvent. The reaction was carried out at minus 5° C. to 0° C. for 3 hours and was then allowed to warm to room temperature overnight. The product was passed over a strongly basic anion exchange resin (IR–900) to remove bromide ion, and methylene chloride was removed by stripping at room temperature and reduced pressure. The brominated polyol was obtained as a normally liquid material having a viscosity of 46,500 centipoise at 25° C. and, upon analysis, was found to have a Hydroxyl No. of 311 mg. KOH/gram. On the basis of the Hydroxyl No., the polyol is a one mol propylene oxide/3,4 - dibromocyclohaxane-1,1-dimethanol adduct and is referred to hereinbelow as Polyol F—F.

Prepolymers of Polyol F—F were prepared as described in the following parts C and D of this example.

C. Preparation of Prepolymer I.—To 3048 grams of tolylene diisocyanate (a mixture of the 2,4- and 2,6-isomers present in a weight ratio of 80:20, respectively) heated to 80° C., there was added over a 30 minute period, 591 grams of the aforesaid brominated Polyol F—F. The reaction was exothermic and cooling was necessary to maintain the reaction temperature at 75°–85° C. The reaction mixture was heated at 80° C. for an additional hour. The liquid reaction product had a viscosity of about 23 centipoise at 25° C. and calculated bromine and free-NCO contents of 7.20 and 36.6 weight percent, respectively. This product is designated Prepolymer I.

D. Preparation of Prepolymer II.—The reaction of part C of this example was repeated except that 2610 grams of the tolylene diisocyanate and 933 grams of brominated Polyol F—F were employed. The liquid reaction product had a viscosity of 117 centipoise at 25° C. and calculated bromine and free-NCO contents of 11.65 and 29.5 weight percent, respectively. This product is designated herein as Prepolymer II.

At the time Prepolymers I and II were prepared, the respective acidities thereof as well as of Polyol F—F were determined. Acidity measurements were also made after one and two weeks of storage at room temperature. The results of these determinations are as follows:

TABLE XIII

| Material | Acid, percent by weight as HCl | | |
|---|---|---|---|
| | Initial | 1 week | 2 weeks |
| Polyol F-F | 0.083 | 0.157 | 0.222 |
| Prepolymer I | 0.0124 | 0.0119 | 0.0118 |
| Prepolymer II | 0.0231 | 0.0212 | 0.0220 |

The data of Table XIII show that prereaction of the brominated polyol flame-retardants of this invention with the polyisocyanate reactant to form prepolymers improves storage stability, the acidity of the prepolymers being essentially unchanged over the two week period.

EXAMPLES XXXVIII–XLIII

In accordance with these examples, a series of flexible polyurethane foams were prepared employing Polyol F—F, Prepolymer I and Prepolymer II, as the respective flame-retardant components of Foam Formulation B of Table III hereinabove. In the foam preparations of these examples, as well as in Control Runs K–7 and K–10 in which no flame-retardant was used, and in Control Runs K–8, –9, –11 and –12 in which dibromoneopentyl glycol was used as the control flame-retardant, the procedure described above with specific reference to Examples II–XII was employed. In view of the liquid nature of Polyol F—F and of Prepolymers I and II, they were added as liquid streams and readily formed respective homogeneous liquid solutions in the polyether polyol at room temperature. The relative proportions of those components of Foam Formulation B which were varied are given in Tables XIV and XV below. Flammability characteristics were determined for each of the foamed products by the aforementioned ASTM D–1692–67 T test as well as in accordance with Motor Vehicle Safety Standard No. 302. A foam sample passes the Motor Vehicle flammability test if the burning rate is less than 4 inches per minute. The results of these flammability determinations are given in the following Tables XIV and XV wherein "SE," as used with specific reference to the Motor Vehicle test, denotes that the sample burned out (that is, self-extinguished) before the 1½" gauge mark, measured from the end of the foam sample which had been ignited.

TABLE XIV

| Example No. (Control Run) | (K-7) | (K-8) | (K-9) | XXXVIII | | XXXIX | | XL | |
|---|---|---|---|---|---|---|---|---|---|
| Foam formulation B:[1] | | | | | | | | | |
| Flame-retardant | | DBNG[2] | | Dibromo polyol F—F[3] | | Prepolymer I[4] | | Prepolymer II[4] | |
| Parts by weight | 0 | 5 | 7 | 3.4 | 6.9 | 10.5 | 20.92 | 42.45 | 64.7 | 12.92 | 26.20 | 39.90 |
| Polyether polyol, pts. by wt | 100 | 77.22 | 68.1 | 96.6 | 93.1 | 89.5 | 96.6 | 93.1 | 89.5 | 96.6 | 93.1 | 89.5 |
| Diisocyanate, pts. by wt | 49.8 | 53.3 | 54.6 | 51.1 | 52.6 | 54.2 | 33.58 | 17.05 | 00 | 41.58 | 33.3 | 24.8 |
| Stannous octoate, pts. by wt | 0.275 | 0.20 | 0.15 | 0.275 | 0.25 | 0.20 | 0.275 | 0.25 | 0.20 | 0.275 | 0.25 | 0.20 |
| Cream time, seconds | 7 | 7 | 7 | 7 | 7 | 10 | 7 | 7 | 9 | 7 | 7 | 10 |
| Rise time, seconds | 78 | 80 | 95 | 78 | 82 | 102 | 86 | 98 | 130 | 86 | 102 | 140 |
| Wt. percent in polymer, calcd.[5] | 00 | 1.93 | 2.64 | 0.997 | 2.002 | 3.02 | 0.997 | 2.002 | 3.02 | 0.997 | 2.002 | 3.02 |
| Flammability by ASTM D–1692–67T before sample conditioning: | | | | | | | | | | | | |
| Rating | B | SE | SE | B | SE | SE | B | SE | SE | B | B | SE |
| Burning extent, inches | | 2.4 | 1.8 | | 3.8 | 2.7 | | 3.0 | 2.3 | | | 3.4 |
| Extinguishing time, seconds | | 28 | 42 | | 41 | 31 | | 33 | 36 | | | 40 |
| Burning rate, inches/minute | 6.13 | 5.16 | 2.56 | 4.70 | 5.45 | 5.29 | 5.77 | 5.42 | 3.77 | 5.78 | 5.38 | 5.13 |
| Flammability by Motor Vehicle Safety Standard No. 302: | | | | | | | | | | | | |
| Burning length, inches | 10 | 0.5 | 0 | 10 | 0 | 0 | 10 | 0 | 0 | 10 | 0 | 0 |
| Burnin time, seconds | 136 | 9 | 0 | 163 | 0 | 0 | 160 | 0 | 0 | 168 | 0 | 0 |
| Burning rate, inches/minute | 4.40 | 3.64 | SE | 3.68 | SE | SE | 3.76 | SE | SE | 3.57 | SE | SE |
| After dry heat aging: | | | | | | | | | | | | |
| Burning extent, inches | 10 | 0 | 0 | 0 | 0 | 0 | 0 | 0 | 0 | 0 | 0 | 0 |
| Burning time, seconds | 154 | 0 | 0 | 0 | 0 | 0 | 0 | 0 | 0 | 0 | 0 | 0 |
| Burning rate, inches/minute | 3.90 | SE | SE | SE | SE | SE | SE | SE | SE | SE | SE | SE |

[1] The relative proportions of water, amine and silicone surfactant components of Foam Formulation B are as given in Table III.
[2] Dibromoneopentyl glycol presented as a control.
[3] One mol propylene oxide/3,4-dibromocyclohexane-1,1-dimethanol having an acidity of 0.157 weight percent as HCl.
[4] Produced in accordance with Example XXXVII and aged for one week, the respective acidities being 0.0119 and 0.0212 weight percent as HCl.
[5] The total weight of the polymer is taken as the combined weight of diisocyanate, polyether polyol and flame-retardant.

TABLE XV

| Example No. (Control Run) | (K-10) | (K-11) | (K-12) | XLI | | XLII | | XLIII | | | |
|---|---|---|---|---|---|---|---|---|---|---|---|
| Foam formulation B:[1] | | | | | | | | | | | |
| Flame-retardant | | DBNG[2] | | Dibromo polyl F—F[3] | | Prepolymer I[4] | | Prepolymer II[4] | | | |
| Parts by weight | 0 | 5 | 7 | 3.4 | 6.9 | 10.5 | 20.92 | 42.45 | 64.7 | 12.92 | 26.20 | 39.90 |
| Polyether polyol, pts. by wt | 100 | 77.22 | 68.1 | 96.6 | 93.1 | 89.5 | 96.6 | 93.1 | 89.5 | 96.6 | 93.1 | 89.5 |
| Diisocyanate, pts. by wt | 49.8 | 53.3 | 54.6 | 51.1 | 52.6 | 54.2 | 33.58 | 17.05 | 00 | 41.58 | 33.3 | 24.8 |
| Stannous octoate, pts. by wt | 0.275 | 0.20 | 0.15 | 0.275 | 0.25 | 0.20 | 0.275 | 0.25 | 0.20 | 0.275 | 0.25 | 0.20 |
| Cream time, seconds | 7 | 7 | 7 | 7 | 9 | 10 | 7 | 7 | 9 | 7 | 7 | 9 |
| Rise time, seconds | 72 | 81 | 93 | 75 | 87 | 105 | 78 | 97 | 134 | 77 | 98 | 130 |
| Wt. percent Br in polymer, calcd.[5] | 00 | 1.93 | 2.64 | 0.997 | 2.002 | 3.02 | 0.997 | 2.002 | 3.02 | 0.997 | 2.002 | 3.02 |
| Flammability By ASTM D-1692-67T before sample conditioning: | | | | | | | | | | | | |
| Rating | B | SE | SE | SE | SE | SE | B | SE | SE | B | SE | SE |
| Burning extent, inches | | 1.5 | 1.6 | 3.8 | 1.8 | 1.7 | | 1.8 | 2.6 | | 2.5 | 1.7 |
| Extinguishing time, seconds | | 28 | 21 | 48 | 23 | 22 | | 23 | 33 | | 26 | 22 |
| Burning rate, inches/minute | 6.08 | 3.26 | 4.47 | 4.73 | 4.66 | 4.76 | 5.18 | 4.75 | 4.79 | 5.50 | 5.68 | 4.71 |
| Flammability by motor vehicle safety standard No. 302: | | | | | | | | | | | | |
| Burning length, inches | 10 | 0 | 0 | 3.3 | 0 | 0 | 10 | 0 | 0 | 0 | 0 | 0 |
| Burning time, seconds | 149 | 0 | 0 | 55 | 0 | 0 | 189 | 0 | 0 | 0 | 0 | 0 |
| Burning rate, inches/minute | 4.02 | SE | SE | 3.54 | SE | SE | 3.17 | SE | SE | SE | SE | SE |
| After dry heat aging: | | | | | | | | | | | | |
| Burning extent, inches | 0 | 0 | 0 | 0 | 0 | 0 | 0 | 0 | 0 | 0 | 0 | 0 |
| Burning time, seconds | 164 | 0 | 0 | 0 | 0 | 0 | 0 | 0 | 0 | 0 | 0 | 0 |
| Burning rate, inches/minute | 3.66 | SE | SE | SE | SE | SE | SE | SE | SE | SE | SE | SE |

[1] The relative proportions of water, amine and silicone surfactant components of Foam Formulation B are as given in Table III.
[2] Dibromoneopentyl glycol presented as a control.
[3] One mol propylene oxide/3,4-dibromocyclohexane-1,1-dimethanol having an acidity of 0.222 weight percent as HCl.
[4] Produced in accordance with Example XXXVII and aged for two weeks, the respective acidities being 0.0118 and 0.0220 weight percent as HCl.
[5] The total weight of the polymer is taken as the combined weight of diisocyanate, polyether polyol and flame-retardant.

The data of the foregoing Tables XIV and XV further demonstrate the effectiveness of the 3,4-dibromocyclohexane diol flame-retardants of the present invention including the diisocyanate prepolymers thereof.

What is claimed is:

1. As new compositions of matter, cycloaliphatic diols having the general formula,

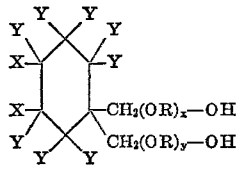

wherein:
X individually is bromine and the two X's collectively represent a second bond between the two adjacent carbon atoms;
Y designates a member of the class consisting of hydrogen and an alkyl radical having from 1 to 4 carbon atoms;
OR designates an oxyalkylene group having from 2 to 4 carbon atoms or mixtures thereof; and
$x$ and $y$ each has a value from 0 to 12, provided the sum $x+y$ has an average value from about 0.5 to about 12.

2. A cycloaliphatic diol as defined in claim 1 in which the oxyalkylene groups represented by OR comprise oxypropylene units.

3. A cycloaliphatic diol as defined in claim 1 in which the oxyalkylene groups represented by OR comprise oxyethylene units.

4. A cycloaliphatic diol as defined in claim 1 wherein X is bromine and each Y is hydrogen.

5. A cycloaliphatic diol as defined in claim 1 wherein the two X's collectively represent a second bond between the two adjacent carbon atoms and each Y is hydrogen.

6. Oxyalkylated 3-cyclohexene-1,1-dimethanol having the average structural formula:

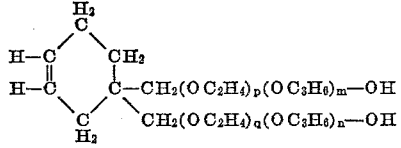

wherein $p$, $q$, $m$ and $n$ each has a value of from zero to about 12, provided the sum $p+q+m+n$ has an average value from about 0.5 to about 12.

7. A 3,4-dibromocyclohexane diol having the average structural formula:

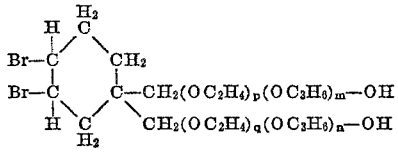

wherein $p$, $q$, $m$ and $n$ each has a value of from zero to about 12, provided the sum $p+q+m+n$ has an average value from about 0.5 to about 12.

8. Propylene oxide adducts of 3-cyclohexene-1,1-dimethanol having the average structural formula,

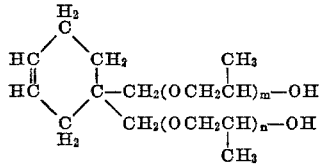

wherein: $m$ and $n$ each has a value of from zero to about 10, provided the sum $m+n$ has an average value from about 0.5 to about 10.

9. Propylene oxide adducts of 3,4-dibromocyclohexane-1,1-dimethanol having the average structural formula,

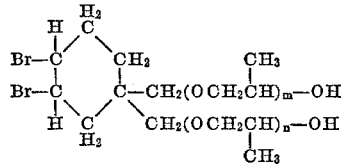

wherein: $m$ and $n$ each has a value of from zero to about 10, provided the sum $m+n$ has an average value from about 0.5 to about 10.

10. A cycloaliphatic diol having the formula,

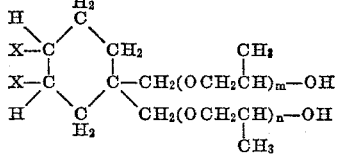

wherein: X individually is bromine and both X's collectively represent a second bond between the adjacent carbon atoms; and each of $m$ and $n$ has a value from 0 to 12, provided the sum $m+n$ has an average value from about 0.5 to about 12.

11. A cycloaliphatic diol as defined in claim 10 in which the average value of $m+n$ is at least about 0.7.

12. A cycloaliphatic diol as defined in claim 11 in which $m+n$ is no higher than about 1.6.

13. A cycloaliphatic diol as defined in claim 10 in which the average value of $m+n$ is about one.

References Cited

UNITED STATES PATENTS

| | | | |
|---|---|---|---|
| 2,652,418 | 9/1953 | De Groote | 260—611 B |
| 2,679,523 | 5/1954 | De Groote | 260—611 B |
| 2,819,214 | 1/1958 | De Groote et al. | 260—611 B |
| 2,900,407 | 8/1959 | Lanham | 260—937 |
| 2,903,474 | 9/1959 | Lanham | 260—937 |
| 3,381,038 | 4/1968 | Lappin | 260—611 B |

BERNARD HELFIN, Primary Examiner

U.S. Cl. X.R.

260—611 B, 77.5 AP, 77.5 AA, 77.5 AM, 2.5 AJ, 2.5 AP